United States Patent
Sun et al.

(10) Patent No.: US 10,409,251 B2
(45) Date of Patent: Sep. 10, 2019

(54) AUTOMATIC INSPECTION AND MONITORING METHOD BASED ON TIME DOMAIN SLOTTING CONTROL

(71) Applicants: China National Petroleum Corporation, Beijing (CN); BGP Inc.,China National Petroleum Corporation, Hebei (CN)

(72) Inventors: Huadong Sun, Beijing (CN); Maojun Yang, Beijing (CN); Fulong Luo, Beijing (CN); Guosheng Li, Beijing (CN); Ying Xia, Beijing (CN); Lei Huang, Beijing (CN); Weiping Liu, Beijing (CN); Liuzheng Zhang, Beijing (CN); Yuan Wang, Beijing (CN)

(73) Assignees: China National Petroleum Corporation, Beijing (CN); BGP Inc., China National Petroleum Corporation, Hebei (CN)

( * ) Notice: Subject to any disclaimer, the term of this patent is extended or adjusted under 35 U.S.C. 154(b) by 494 days.

(21) Appl. No.: 15/159,251

(22) Filed: May 19, 2016

(65) Prior Publication Data

US 2016/0299482 A1 Oct. 13, 2016

Related U.S. Application Data

(63) Continuation of application No. PCT/CN2014/091770, filed on Nov. 20, 2014.

(30) Foreign Application Priority Data

Nov. 20, 2013 (CN) .......................... 2013 1 0586032

(51) Int. Cl.
*G05B 19/048* (2006.01)
*H04B 13/02* (2006.01)
(Continued)

(52) U.S. Cl.
CPC ........... *G05B 19/048* (2013.01); *G01V 1/008* (2013.01); *G05B 19/4185* (2013.01);
(Continued)

(58) Field of Classification Search
CPC ........ G05B 19/048; G05B 2219/33212; G05B 19/4185; G05B 2219/25428;
(Continued)

(56) References Cited

U.S. PATENT DOCUMENTS 5,029,164 A * 7/1991 Goldstein ............. H04J 3/1629
370/235
5,720,035 A * 2/1998 Allegre ............... H04L 63/0227
709/225

(Continued)

FOREIGN PATENT DOCUMENTS

CN 1472546 A 2/2004
CN 1667616 A 9/2005
(Continued)

OTHER PUBLICATIONS

Meng, J., et al., "Study on Wireless Distributed Test System and Timing and Synchronization," Instrument Technique and Sensor, No. 5, 16-21 (2009).

(Continued)

*Primary Examiner* — Brian W Wathen
*Assistant Examiner* — Olvin Lopez Alvarez
(74) *Attorney, Agent, or Firm* — Hamilton, Brook, Smith & Reynolds, P.C.

(57) ABSTRACT

An automatic inspection and monitoring method based on time domain slotting control, belonging to the technical field where the field personnel can automatically inspect and monitor a field device of a seismic apparatus in the seismic exploration production. A method of extraction and transmission of a seismic apparatus host on the information of a (Continued)

field device is implemented by a master control program, test information about the seismic apparatus host on the field device can be automatically extracted and classified from the seismic apparatus host, and according to a designed push protocol, a protocol encoding is conducted; a data frame block is automatically generated; and then the information is delivered via a broadcasting station; an encoding protocol of information push is designed for avoiding information loss caused by signal instability, etc. during information push. According to the protocol, the state information on the field device is encoded to generate a data frame block. There is no more need in the present invention for the operating personnel of the seismic apparatus to read and broadcast the content of the field device item by item, and it only needs to set a software operation mode, so that the automatic extraction and transmission of the state information on the field device can be extracted and transmitted.

3 Claims, 5 Drawing Sheets (51) Int. Cl.
| | |
|---|---|
| *H04L 29/08* | (2006.01) |
| *H04L 12/911* | (2013.01) |
| *H04L 12/26* | (2006.01) |
| *G05B 19/418* | (2006.01) |
| *G01V 1/00* | (2006.01) |
| *G01V 1/22* | (2006.01) |

(52) U.S. Cl.
CPC ......... *H04B 13/02* (2013.01); *H04L 43/0823* (2013.01); *H04L 47/826* (2013.01); *H04L 67/12* (2013.01); *G01V 1/22* (2013.01); *G01V 2200/14* (2013.01); *G05B 2219/25428* (2013.01); *G05B 2219/33212* (2013.01); *Y02P 90/18* (2015.11)

(58) Field of Classification Search
CPC ... H04L 47/826; H04L 43/0823; H04L 67/12; H04B 13/02; G01V 1/008; G01V 1/22; G01V 2200/14; Y02P 90/18
USPC ......................................... 700/282
See application file for complete search history.

(56) References Cited

U.S. PATENT DOCUMENTS

| | | | |
|---|---|---|---|
| 5,724,241 A | 3/1998 | Wood et al. | |
| 5,737,330 A * | 4/1998 | Fulthorp | H04B 7/18539 370/346 |
| 6,219,620 B1* | 4/2001 | Park | G01V 1/223 702/14 |
| 7,660,204 B2* | 2/2010 | Li | G01V 1/22 367/38 |
| 7,894,301 B2* | 2/2011 | Eperjesi | G01V 1/223 367/77 |
| 2002/0038324 A1* | 3/2002 | Page | H03H 17/0225 708/300 |
| 2004/0100927 A1* | 5/2004 | Black | H04B 7/2628 370/335 |
| 2006/0083197 A1* | 4/2006 | Kang | H04W 74/0841 370/329 |
| 2008/0080311 A1* | 4/2008 | Eperjesi | G01V 1/223 367/77 |
| 2008/0273518 A1* | 11/2008 | Pratt | G01D 21/00 370/345 |
| 2009/0010203 A1* | 1/2009 | Pratt, Jr. | H04L 12/66 370/328 |
| 2009/0204265 A1* | 8/2009 | Hackett | G05B 19/4185 700/284 |
| 2010/0027235 A1* | 2/2010 | Samuelson | F17D 5/06 361/816 |
| 2010/0057959 A1* | 3/2010 | Korrek | G05B 19/042 710/110 |
| 2011/0099446 A1* | 4/2011 | Murakami | H04L 1/0041 714/748 |
| 2011/0109438 A1* | 5/2011 | Dijkstra | H04Q 9/00 340/8.1 |
| 2011/0285516 A1* | 11/2011 | Ritter | H04W 88/04 340/286.02 |
| 2012/0182835 A1* | 7/2012 | Davis | G01S 3/80 367/118 |
| 2012/0287913 A1* | 11/2012 | Lee | H04W 72/1252 370/337 |
| 2013/0016625 A1* | 1/2013 | Murias | H04W 8/005 370/254 |
| 2014/0307526 A1* | 10/2014 | Crice | G01V 1/22 367/76 |
| 2015/0177733 A1* | 6/2015 | Isaksson | H04Q 9/00 700/73 |
| 2016/0299482 A1 | 10/2016 | Sun et al. | |
| 2016/0352555 A1* | 12/2016 | Pei | H04L 27/2656 |
| 2018/0154845 A1* | 6/2018 | Weiss | B60R 16/023 |

FOREIGN PATENT DOCUMENTS

| | | | | |
|---|---|---|---|---|
| CN | 101761334 A | | 6/2010 | |
| CN | 101841933 A | | 9/2010 | |
| CN | 101848542 A | | 9/2010 | |
| CN | 101860520 A | | 10/2010 | |
| CN | 201910795 U | | 7/2011 | |
| CN | 102184616 A | | 9/2011 | |
| CN | 102213768 A | | 10/2011 | |
| CN | 102230972 | * | 11/2011 | ............... G01V 1/22 |
| CN | 102565850 A | | 7/2012 | |
| CN | 102854543 A | | 1/2013 | |
| EP | 3073293 | * | 9/2016 | ............. G01V 1/003 |
| EP | 3073339 A1 | | 9/2016 | |
| WO | WO 2007/104152 A2 | | 9/2007 | |
| WO | WO 2015/074584 A1 | | 11/2014 | |

OTHER PUBLICATIONS

International Search Report for International Application No. PCT/CN2014/091770, titled: Automatic Inspection and Monitoring Method Based on Time Domain Slotting Control, dated Feb. 17, 2015, pp. 4.

Nanometrics Inc. et al., "Taurus Portable Seismograph User Guide," pp. i-xiv, 1-208 (Feb. 9, 2007).

* cited by examiner

AUTOMATIC INSPECTION AND MONITORING METHOD BASED ON TIME DOMAIN SLOTTING CONTROL

RELATED APPLICATIONS

This application is a continuation of International Application No. PCT/CN2014/091770, which designated the United States and was filed on Nov. 20, 2014, published in Chinese, which claims the benefit of Chinese Application No. 201310586032.X, filed on Nov. 20, 2013. The entire teachings of the above applications are incorporated herein by reference.

FIELD OF THE INVENTION

The present invention relates to an automatic inspection and monitoring method based on time domain slotting control, belonging to the technical field where the field personnel can automatically inspect and monitor a field device of a seismic apparatus in the seismic exploration production.

BACKGROUND OF THE INVENTION

In the present seismic exploration production, an inspection and monitoring of a field device of a seismic apparatus is still carried out relying on the traditional manual mode, namely, a seismic apparatus operator needs to read out content of a field device item by item after detecting the field device by using a host machine of the seismic apparatus, and broadcast to the field personnel via a voice station, the field personnel need to perform an inspection and monitoring following manual documentation. Such a type of operating has a high operational difficulty and a heavy workload, and a mistake easily occurs in terms of human manipulation and communication.

SUMMARY OF THE INVENTION

In order to overcome deficiencies of the prior art, the embodiments of the present invention provide an automatic inspection and monitoring method based on time domain slotting control.

An automatic inspection and monitoring method based on time domain slotting control comprising the steps of:

Step 1: installing a master control software onto the seismic apparatus host or other computers connected with the seismic apparatus host, and installing a monitoring software onto a hand-held intelligent transceiving tablet computer or other device supporting a co-band transceiving function compatible with the system;

Step 2: a master control program upon actuation automatically invoking the parameter settings saved last time (invoking system default parameters, upon first use), and sending a master control program online notification, in this event, parameters of the master control program can be changed at any time, the parameters of the master control program come into effect after the application being stored, the master control program waits for a monitoring program online notification in operation at any time, and responds in a timely manner;

Step 3: a monitoring program upon actuation automatically invoking the parameter settings saved last time (invoking system default parameters, upon first use), and automatically sending a monitoring program online notification until an acknowledgement notification of the master control program and time domain slotting time information are received, parameters of the monitoring program can be changed at any time, the parameters of the monitoring program come into effect after the application being stored;

Step 4: the master control program recording the number of the monitoring programs and applying a scheme of an extraction and transmission method for the field device of the seismic apparatus host based on requirements of parameter settings for carrying out a time domain slotting control, so as to transmit information on the field device of the seismic apparatus host to each terminal program, and meanwhile waiting for and processing information from a terminal monitor; at the same time, a terminal program functions by using a field monitor and a monitoring and managing method for the field device information until an order of forcing to be offline from the master control program or taking the terminal program off-line through manual closing is received; and Step 5: when a terminal program is off-line, the master control program may automatically respond, change the time domain slotting control method, while when the master control program is off-line, the terminal program may also automatically respond, and automatically periodically send out a request signal of going on-line, and then continue to operate normally until there is a response from the master control program.

These are advantages of the present invention:

Compared with the inspection and monitoring method for field device applied today, the present invention has the following effects:

1) there is no more need for the operating personnel of the seismic apparatus to read and broadcast the content of a field device item by item, and it only needs to set a software operation mode, so that the automatic extraction and transmission of the state information on the field device can be achieved;
2) there is no more need for the field personnel to select the items within their own ranges item by item for inspection after listening to a radio and making a note of the listened content, and it only needs to set a software operation mode, so that it is possible to automatically receive status data for their own field devices alone, and hear alerts and prompts;
3) there is no more need for the field personnel to repeat a voice acknowledgment of inspection condition of devices with the seismic apparatus operator, and the field personnel only need to transmit device inquiry information, so that the automatic inspection can be achieved;
4) there is no more need for the seismic apparatus operator to pay attention to a status of the field device at all times at the time of production, during production, the present invention can automatically extract and transmit the field device information at set intervals, and implement an automatic monitoring in real time; and
5) avoiding a data transmission error in the process of manual operation and communication caused for reasons such as slips of tongue, bad signals, clerical errors and the like, and a waste of unnecessary production time.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

In order to more clearly illustrate the technical solution of the embodiments of the present invention, the following will briefly introduces the accompanying drawings to be used in the description of the embodiments. Obviously, the figures in the following description are only some embodiments of the present invention. Persons skilled in the art can also obtain other figures based on these figures under the premise that no creative effort would be required. In the figures.

DETAILED DESCRIPTION OF THE INVENTION

A description of example embodiments of the invention follows.

Embodiment 1: as shown in FIGS. 1, 2, 3, 4 and 5, an automatic inspection and monitoring method based on time domain slotting control, in order to address difficulties that are labor intensive, time consuming, error prone and the like for inspection and monitoring of a field device in modern seismic exploration production, the present invention enables the field personnel to automatically inspect and monitor a field device by developing a software, designing an information push protocol and a time domain slotting control method with respect to characteristics of such work, so as to save time to complete the work and improve an overall operation efficiency of seismic exploration production work.

Figure 1:
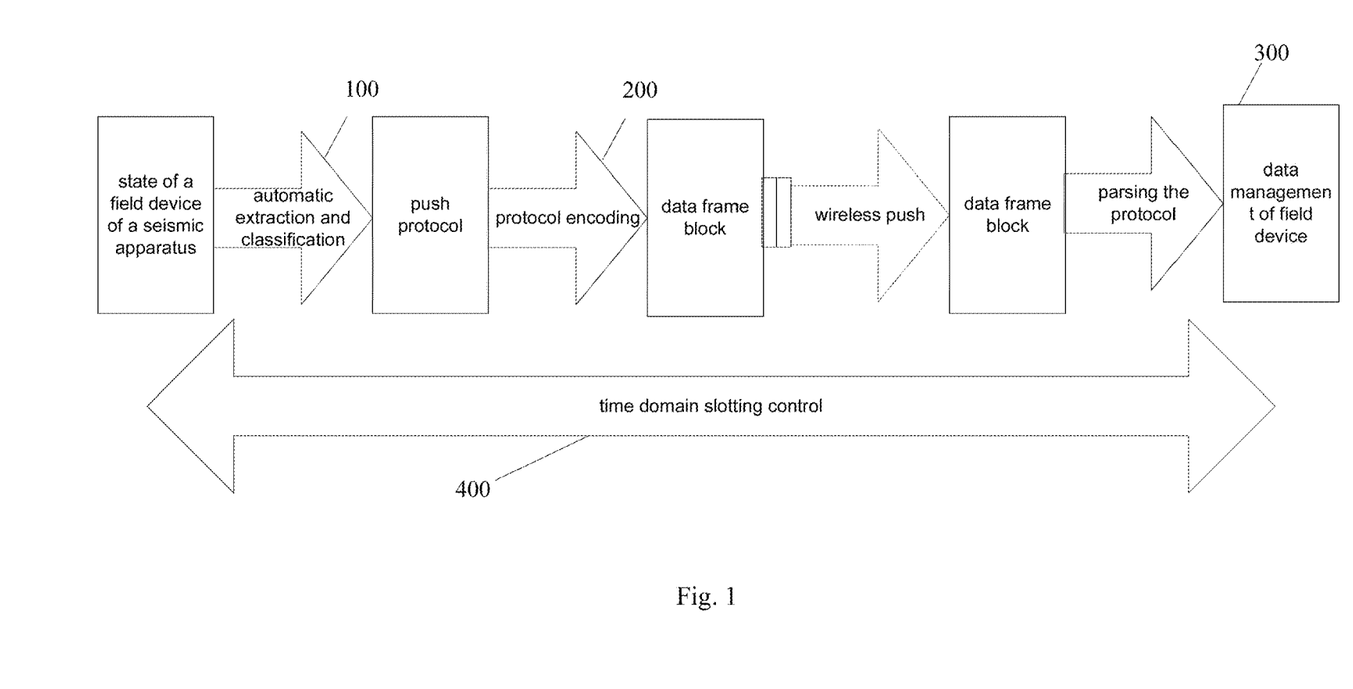
FIG. 1 is a schematic drawing of a workflow diagram for an automatic inspection and monitoring method based on time domain slotting control.

An automatic inspection and monitoring method based on time domain slotting control, as shown with reference to FIG. 1, comprising: a method of extraction and transmission of a seismic apparatus host on the information of a field device 100, a method of reception and management of a field monitor on the information of a field device 300, an encoding protocol of information push 200 and a time domain slotting control 400.

The method of extraction and transmission of a seismic apparatus host on the information of a field device is implemented by a master control program, test information about the seismic apparatus host on the field device can be automatically extracted and classified from the seismic apparatus host, and according to a designed push protocol, a protocol encoding is conducted; a data frame block is automatically generated; and then the information is delivered via a broadcasting station.

The encoding protocol of information push is designed for avoiding information loss caused by signal instability, etc. during information push. The state information on the field device is encoded according to the protocol to generate a data frame block, so that the signals are effectively retrieved or retransmitted when the signals are lost, thereby ensuring information integrity. The encoding protocol of information push mainly includes a channel data protocol, a voltage value protocol, a range value protocol, an inquiry request protocol and an instant dialog protocol and the like. The information on the field device of the seismic apparatus host is encoded according to the protocol, to generate a data frame block in a fixed format upon extraction and transmission, and then the information in such format is pushed, parsing is conducted also according to the protocol while the monitor receives this data frame block, so as to obtain state information on the field device.

The data frame block refers to state information on the field device of the seismic apparatus, and is encoded through the encoding protocol of information push, where each field device automatically generates one data frame block, since status information on the field device differs, the produced data frame block is different in size, and each data frame block has a CRC redundancy checking function.

The master control program is installed onto the seismic apparatus host or other computers connected with the seismic apparatus host for implementing extraction and classification of information on the field device of the seismic apparatus host, and automatically generating a data frame block by using the encoding protocol of information push, and controlling a station to transmit the state of the field device of the seismic apparatus to the field monitoring program by using the time domain slotting method.

The method of reception and management of a field monitor on the information of a field device is implemented by monitoring programs, the received data frame blocks can be parsed according to the protocol format, the field device status data obtained by parsing are stored and managed according to setup requirements, thereby realizing the field personnel's automatic inspection and management of the seismic apparatus and device.

The monitoring program is installed onto a specially-made hand-held intelligent transceiving tablet computer or other device supporting a co-band transceiving function compatible with the system, and implements a reception of the data frame block of the master control program by using the time domain slotting method, and automatically parses the data frame block by applying the encoding protocol of information push for obtaining the state information on the field device of the seismic apparatus therefrom, and manages the state information according to the setup requirements.

The time domain slotting control is designed for avoiding signal loss caused by signal collisions of a field monitor, and allows each terminal device to transmit information by a time-share according to the time domain slotting control mode, and ensures that a signal is stable. The time domain slotting control mainly comprises five kinds of control modes such as a conventional time slot control, a repetition unit control, an intelligence decision control, a repetition master transmission control and an inquiry transceiving control, among which any one is selected and used based on different requirements for operation after the information on the field device of the seismic apparatus host is extracted, and the operating modes can be intelligently switched to achieve an effect of information transmission and inquiry in an optimization and minimalist time fashion.

Embodiment 2: the present invention is further explained in detail with reference to FIGS. 1, 2, 3, 4 and 5, a work flow for an automatic inspection and monitoring method based on time domain slotting control, please see FIG. 1, extracting and classifying the corresponding data from the state data of the field device tested by the seismic apparatus host, according to the process of automatic extraction and transmission of information on the field device of the seismic apparatus host 100, undergoing an encoding 200 according to the information push protocol and transmitting the data frame block, the field personnel receive a data frame block through the field monitor in the reception and management method flow for the field device information and parse the same according to the information push protocol 300, obtain the state of the field device and conduct management according to the setup requirements, thereby realizing the field personnel's automatic inspection and monitoring of the field device.

Figure 2:
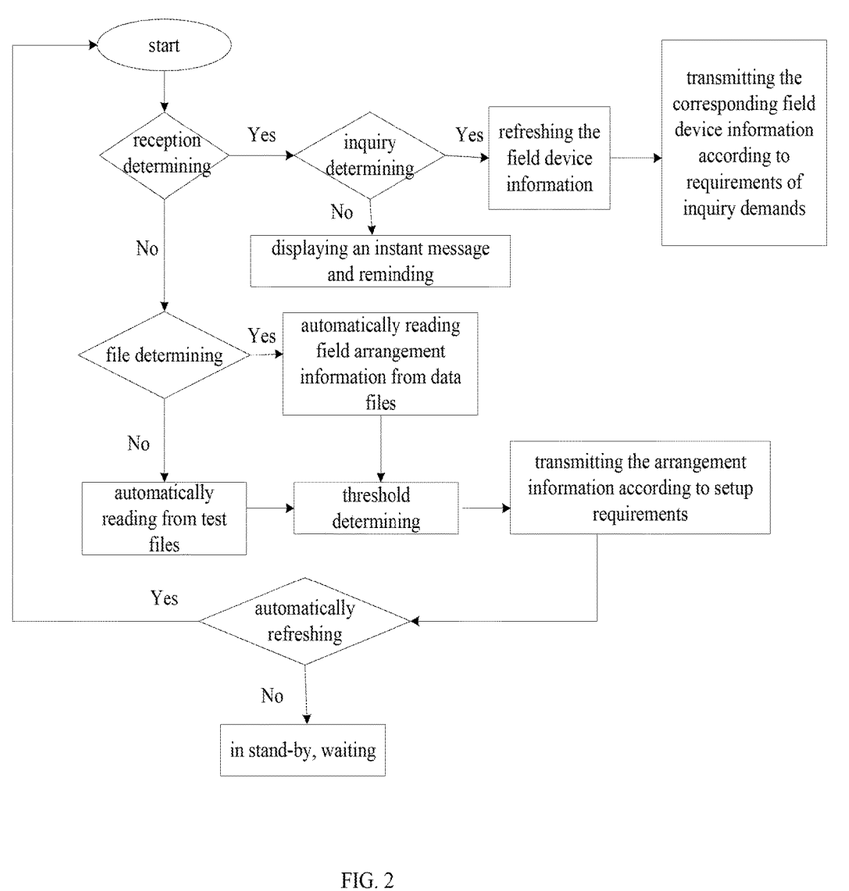
FIG. 2 is a flow schematic diagram of extraction and transmission method of information on the field device of the seismic apparatus host of the present invention.

As shown in FIG. 2, the method of extraction and transmission of the information on the field device of the seismic apparatus host is realized by self-programming software, the flow thereof is when the software starts to run, firstly detecting whether the field information is received, if this is the case, carrying out an inquiry determination of the information, when it is determined to be inquiry information, automatically refreshing the information on the field device, and transmitting the information according to inquiry requirements, if the inquiry is determined to be non-inquiry information, it is instant message information, which is directly shown; if it is determined to be not receiving the field information, automatically reading field arrangement information, and classifying the field device information according to requirements of a value threshold and a scope of personnel and the like, and then performing a refreshing determination, if performing a refreshing is continued, returning to the status of information reception for cycles, and if the refreshing is completed let it in a standby state.

Figure 3:
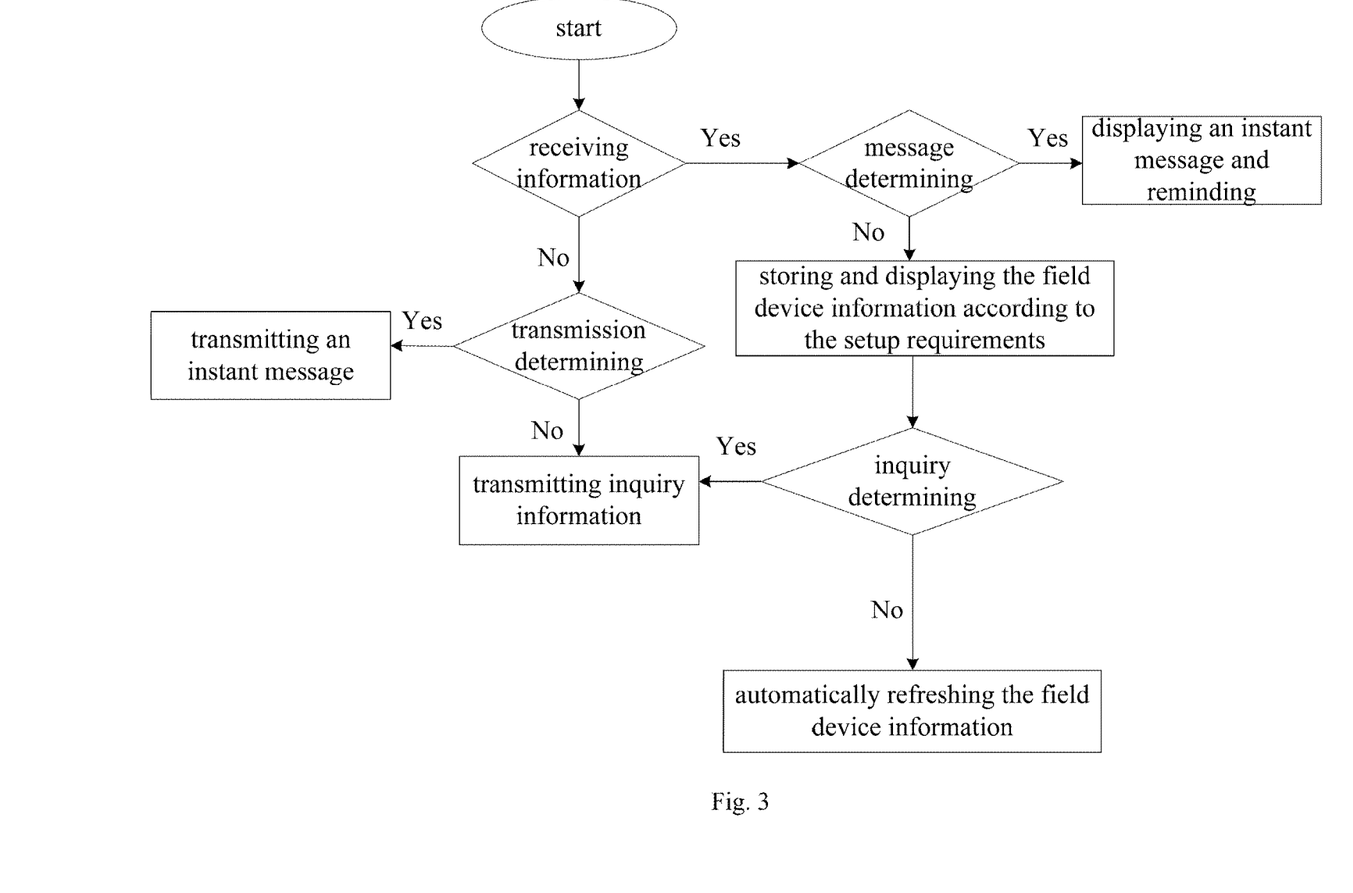
FIG. 3 is a flow schematic diagram of reception and management method of information about the field monitor on the field device of the present invention.

As shown in FIG. 3, the method of reception and management of the information about the field monitor on the field device is realized by self-programming software, the flow thereof is when the software starts to run, firstly detecting whether the host information is received, if this is the case, carrying out a determination of message, when it is determined to be a message, showing the instant message; if it is determined to be a non-message, managing the field device information according to the setup requirements of this monitor, and automatically refreshing the information on this device; if it is determined to be not receiving the information on this device, determining the transmission requirements; if this is the case, transmitting an instant message, if not, transmitting the inquiry information.

Figure 4:
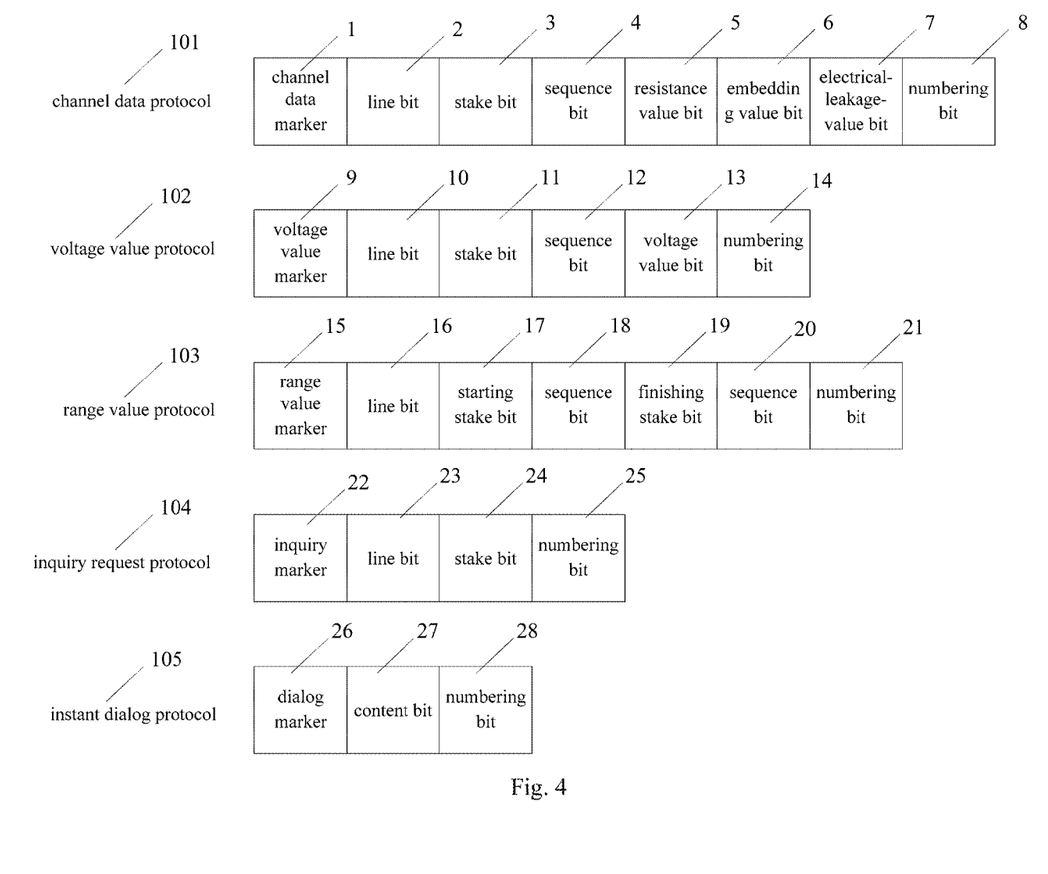
FIG. 4 is a structural schematic drawing of information push protocol of the present invention.

As shown in FIG. 4, the information push protocol includes a channel data protocol 101, a voltage value protocol 102, a range value protocol 103, an inquiry request protocol 104 and an instant dialog protocol 105.

The channel data protocol 101 consists of a channel data marker 1, a line bit 2, a stake bit 3, a sequence bit 4, a resistance value bit 5, an embedding value bit 6, an electrical-leakage-value bit 7 and a numbering bit 8, wherein the channel data marker 1 is a marker that the field device data contained in this data frame block is channel data, the line bit 2 and stake bit 3 are numbers of line and stake where the field device is positioned, the sequence bit 4 is a sequence number of this field device, the resistance value bit 5, the embedding value bit 6, and the electrical-leakage-value bit 7 are concrete numerical values of resistance, embedment and electrical leakage of this field device, and the numbering bit 8 is a numbering value that this data frame block needs to transmit to the monitor, they are mainly used for the field personnel to perform a concrete item inspection for problematic field devices.

The voltage value protocol 102 consists of a voltage value marker 9, a line bit 10, a stake bit 11, a sequence bit 12, a voltage value bit 13, and a numbering bit 14, wherein the voltage value marker is a marker that the field device data contained in this data frame block is a voltage value, the line bit 10 and the stake bit 11 are numbers of line and stake where the field device is positioned, the sequence bit 12 is a sequence number of this field device, the voltage value bit 13 is a concrete voltage value of this field device, and the numbering bit 14 is a numbering value that this data frame block needs to transmit to the monitor, they are mainly used for the field personnel to replace or charge a field feeding device.

The range value protocol 103 consists of a range value marker 15, a line bit 16, a starting stake bit 17, a sequence bit 18, a finishing stake bit 19, a sequence bit 20 and a numbering bit 21, wherein the range value marker is a marker that the field device data contained in this data frame block is a range value, the line bit 16 and the starting stake bit 17 are numbers of line and stake where the field device is positioned, the sequence bit 18 is a sequence number of this field device, the finishing stake bit 19 is number of the stake where the field device is positioned, the sequence bit 20 is a sequence number of this field device, and the numbering bit 21 is a numbering value that this data frame block needs to transmit to the monitor, they are mainly used for the field personnel to learn about the starting and finishing positions of the field device, so as to monitor whether the field device is in an off-line state, and know the specific position for inspection.

The inquiry protocol 104 includes an inquiry marker 22, a line bit 23, a stake bit 24 and a numbering bit 25, wherein the inquiry marker 22 is a marker that this data frame block is inquiry request data, the line bit 23 and the stake bit 24 are numbers of line and stake where the field device required to be inquired is positioned, and the numbering bit 25 is a numbering value that this data frame block transmits to the monitor, they are mainly used for the field personnel to monitor programs to transmit an inquiry request to the master control program of the seismic apparatus host.

The instant dialog protocol 105 includes a dialog marker 26, a content bit 27, and a numbering bit 28, wherein the dialog marker 26 is a marker that this data frame block is instant dialog data, the content bit is the concrete dialog content contained in this data frame block, and the numbering bit 28 is a numbering value that this data frame block needs to transmit to the monitor or this data frame block transmits to the monitor, they are mainly used for delivering the instant dialog content between the seismic apparatus operator and field personnel.

Figure 5:
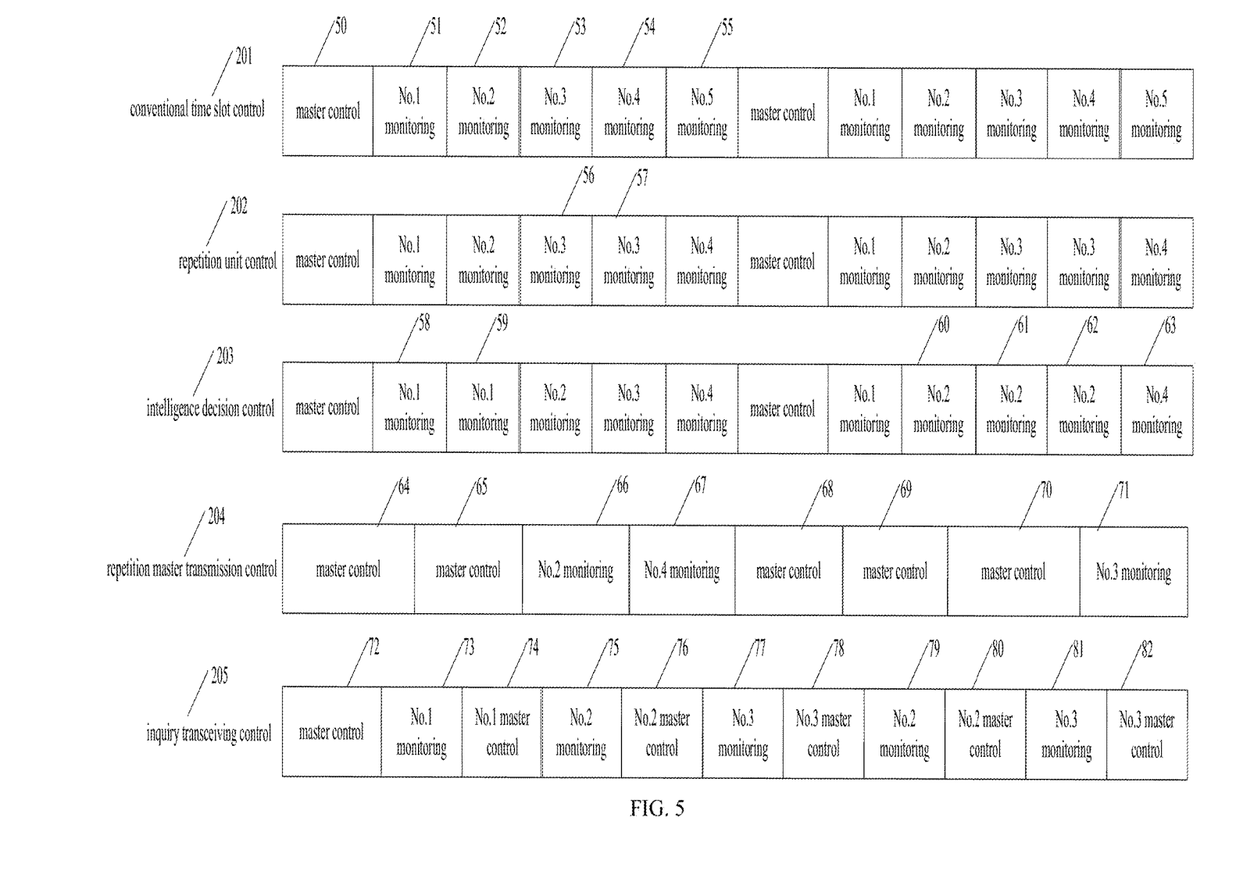
FIG. 5 is a structural schematic drawing of time domain slotting control of the present invention.

As shown in FIG. 5, it is a structural schematic drawing of time domain slotting control comprising five kinds of time domain slotting control modes such as a conventional time slot control 201, a repetition unit control 202, an intelligence decision control 203, a repetition master transmission control 204 and an inquiry transceiving control 205.

The conventional time slot control conducts a time domain slotting control according to one master control time slot for master control program and one monitoring time slot for each monitor, as shown in the conventional time slot control 201 in FIG. 5, taking five monitors as an example, a time domain slotting is conducted according to the order of master control time slot 50, No. 1 monitoring time slot 51, No. 2 monitoring time slot 52, No. 3 monitoring time slot 53, No. 4 monitoring time slot 54, and No. 5 monitoring time slot 55, the master control program and the monitoring program each receives and transmits information based on such an order.

The repetition unit control conducts a time domain slotting control according to one master control time slot and one or more time slots for each monitor, which is intended to facilitate some monitors having a great amount of information, and a heavy workload to have more time to transmit information, as shown in the repetition unit control 202 in FIG. 5, taking four monitors as an example, when more failures occur in the scope of the field device responsible by No. 3 monitor, two time slots 56, 57 or more are successively allocated to the No. 3 monitor to ensure that the No. 3 monitor has more time to transmit information.

The intelligence decision control conducts a time domain slotting control according to one master control time slot and one, more or no time slots for each monitor, which automatically increases or decreases the time slots of some monitor according to the size of amount of information for monitor, such a method can make better use of time-slot resources, but it needs to determine the operating conditions of the monitor in real time and consumes more system resources, as shown in the intelligence decision control 203 in FIG. 5, taking four monitors as an example, when the No. 1 monitor is busy, two time slots 58, 59 are successively allocated, when the No. 2 monitor is busy, three time slots 60, 61 and 62 are successively allocated, in this event, the No. 3 monitor is not operating, and thus no time slots are allocated, going directly to No. 4 monitor, a time slot 63 is allocated.

The repetition master transmission control conducts a time domain slotting control according to more master control time slots and one, more or no time slots for each monitor, which is intended to mainly transmit master control information when more failures occur in the field device, the monitoring program needs to wait for the processing of the master control program and then allocates a time slot to the monitoring program after transmitting an inquiry request, this method makes a relatively slow response to the inquiry request of the monitoring program. As shown in the repetition master transmission control 204 in FIG. 5, master control time slots 64 and 65 are two successive ones, time slots are temporarily assigned to receive No. 2, No. 3 monitor information 66, 67 when information on the monitoring program is received, and a response is made to a transmission request 71 of the No. 3 monitor after another three master control time slots 68, 69 and 70 are assigned.

The inquiry transceiving control conducts a time domain slotting control when the master control program makes a response one by one according to the inquiry request of the monitor, in the case of many inquiry requests, the time slots assigned by the master control program in such a mode are relatively small, the included information is only directed towards some inquiry request, thus the amount of information is smaller. As shown in the inquiry transceiving control 205 in FIG. 5, after a master control time slot 72, an inquiry request 73 of the No. 1 monitor is received, thus the master control program assigns a master control time slot 74 to respond this request, similarly, when the inquiry requests of the No. 2, No. 3 monitors are received, after the time slots 75, 77, 79 and 81 are inquired, master control time slots 76, 78, 80 and 82 are immediately assigned to respond the inquiry requests, based on different specific content of the inquiry request, the assigned master control time slots are different in size, for instance, both the master control time slot 76 and the master control time slot 80 response the inquiry request of the No. 2 monitor, but the time slots are different in size.

Embodiment 3: the present invention is further explained in detail with reference to FIGS. 1, 2, 3, 4 and 5, a work flow for an automatic inspection and monitoring method based on time domain slotting control, comprising: a method of extraction and transmission of information on the field device of the seismic apparatus host, a method of reception and management of information about the field monitor on the field device, an encoding protocol of information push and a time domain slotting control.

It is implemented by the master control program to be capable of automatically extracting and classifying test information about the seismic apparatus host on the field device from the seismic apparatus host, and performing a protocol encoding according to the designed push protocol, automatically generating a data frame block, and then delivering the information via the station.

It is implemented by the monitoring programs to be capable of parsing the received data frame block according to the protocol format, storing and managing status data of the field device obtained by parsing according to setup requirements, thereby realizing the field personnel's automatic inspection and management of the seismic apparatus and device.

The encoding protocol of information push is designed for avoiding information loss caused by signal instability, etc. during information push. The state information on the field device is encoded according to the protocol to generate a data frame block, so that the signals are effectively retrieved or retransmitted when the signals are lost, thereby ensuring information integrity. The encoding protocol of information push mainly includes a channel data protocol, a voltage value protocol, a range value protocol, an inquiry request protocol and an instant dialog protocol and the like. The information on the field device of the seismic apparatus host is encoded according to the protocol to generate a data frame block in a fixed format upon extraction and transmission, and then the information in such format is pushed, parsing is conducted also according to the protocol while the monitor receives this data frame block, so as to obtain state information on the field device.

The time domain slotting control is designed for avoiding signal loss caused by signal collisions of a field monitor, and allows each terminal device to transmit information by a time-share according to the time domain slotting control mode, and ensures that a signal is stable. The time domain slotting control mainly comprises five kinds of control modes such as a conventional time slot control, a repetition unit control, an intelligence decision control, a repetition master transmission control and an inquiry transceiving control, among which is selected and used based on different requirements for operation after the information on the field device of the seismic apparatus host is extracted, and the operating modes can be intelligently switched to achieve an effect of information transmission and inquiry in an optimization and minimalist time fashion.

The master control program is installed onto the seismic apparatus host or other computers connected with the seismic apparatus host for implementing extraction and classification of information on the field device of the seismic apparatus host, and automatically generating a data frame block by using the encoding protocol of information push, and controlling a station to transmit the state of the field device of the seismic apparatus to the field monitoring program by using the time domain slotting method;

The monitoring program is installed onto a specially-made hand-held intelligent transceiving tablet computer or other device supporting a co-band transceiving function compatible with the system, and implements a reception of the data frame block of the master control program by using the time domain slotting method, and automatically parses the data frame block by applying the encoding protocol of information push for obtaining the state information on the field device of the seismic apparatus therefrom, and manages the state information according to the setup requirements.

Embodiment 4: the present invention is further explained in detail with reference to FIGS. 1, 2, 3, 4 and 5, a work flow for an automatic inspection and monitoring method based on time domain slotting control comprising the steps of: extracting and classifying the corresponding data from the state data of the field device tested by the seismic apparatus host, according to the process of automatic extraction and transmission of information on the field device of the seismic apparatus host 100, undergoing an encoding 200 according to the information push protocol and transmitting the data frame block, the field personnel receive a data frame block through the field monitor in the reception and management method flow for the field device information and parse the same according to the information push protocol 300, obtain the state of the field device and conduct management according to the setup requirements, thereby realizing the field personnel's automatic inspection and monitoring of the field device.

The method of extraction and transmission of the information on the field device of the seismic apparatus host is realized by self-programming software, the flow thereof is when the software starts to run, firstly detecting whether the field information is received, if this is the case, carrying out an inquiry determination of information, when it is determined to be inquiry information, automatically refreshing the information on the field device, and transmitting the information according to inquiry requirements, if the inquiry is determined to be non-inquiry information, it is instant message information, which is directly shown; if it is determined to be not receiving the field information, automatically reading field arrangement information, and classifying the field device information according to requirements of a value threshold and a scope of personnel and the like, and then performing a refreshing determination, if performing a refreshing is continued, returning to the status of information reception for cycles, and if the refreshing is completed, let it in a standby state.

The method of reception and management of the information about the field monitor on the field device is realized by self-programming software, the flow thereof is when the software starts to run, firstly detecting whether the host information is received, if this is the case, carrying out a determination of message, when it is determined to be a message, showing the instant message; if it is determined to be a non-message, managing the field device information according to the setup requirements of this monitor, and automatically refreshing the information on this device; if it is determined to be not receiving the information on this device, determining the transmission requirements; if this is the case, transmitting an instant message, if not, transmitting the inquiry information.

The information push protocol includes a channel data protocol 101, a voltage value protocol 102, a range value protocol 103, an inquiry request protocol 104 and an instant dialog protocol 105.

The channel data protocol 101 consists of a channel data marker 1, a line bit 2, a stake bit 3, a sequence bit 4, a resistance value bit 5, an embedding value bit 6, an electrical-leakage-value bit 7 and a numbering bit 8, wherein the channel data marker 1 is a marker that the field device data contained in this data frame block are channel data, the line bit 2 and stake bit 3 are numbers of line and stake where the field device is positioned, the sequence bit 4 is a sequence number of this field device, the resistance value bit 5, the embedding value bit 6, and the electrical-leakage-value bit 7 are concrete numerical values of resistance, embedment and electrical leakage of this field device, and the numbering bit 8 is a numbering value that this data frame block needs to transmit to the monitor, they are mainly used for the field personnel to perform a concrete item inspection for problematic field devices.

The voltage value protocol 102 consists of a voltage value marker 9, a line bit 10, a stake bit 11, a sequence bit 12, a voltage value bit 13, and a numbering bit 14, wherein the voltage value marker is a marker that the field device data contained in this data frame block is a voltage value, the line bit 10 and the stake bit 11 are numbers of line and stake where the field device is positioned, the sequence bit 12 is a sequence number of this field device, the voltage value bit 13 is a concrete voltage value of this field device, and the numbering bit 13 is a numbering value that this data frame block needs to transmit to the monitor, they are mainly used for the field personnel to replace or charge a field feeding device.

The range value protocol 103 consists of a range value marker 15, a line bit 16, a starting stake bit 17, a sequence bit 18, a finishing stake bit 19, a sequence bit 20 and a numbering bit 21, wherein the range value marker is a marker that the field device data contained in this data frame block is a range value, the line bit 16 and the starting stake bit 17 are numbers of line and stake where the field device is positioned, the sequence bit 18 is a sequence number of this field device, the finishing stake bit 19 is number of the stake where the field device is positioned, the sequence bit 20 is a sequence number of this field device, and the numbering bit 21 is a numbering value that this data frame block needs to transmit to the monitor, they are mainly used for the field personnel to learn about the starting and finishing positions of the field device, so as to monitor whether the field device is in an off-line state, and know the specific position for inspection.

The inquiry protocol 104 includes an inquiry marker 22, a line bit 23, a stake bit 24 and a numbering bit 25, where the inquiry marker 22 is a marker that this data frame block is inquiry request data, the line bit 23 and the stake bit 24 are numbers of line and stake where the field device required to be inquired is positioned, and the numbering bit 25 is a numbering value that this data frame block transmits to the monitor, they are mainly used for the field personnel to monitor programs to transmit an inquiry request to the master control program of the seismic apparatus host.

The instant dialog protocol 105 includes a dialog marker 26, a content bit 27, and a numbering bit 28, where the dialog marker 26 is a marker that this data frame block is instant dialog data, the content bit is the concrete dialog content contained in this data frame block, and the numbering bit 28 is a number value that this data frame block needs to transmit to the monitor or transmits this data frame block to the monitor, they are mainly used for delivering the instant dialog content between the seismic apparatus operator and field personnel.

The time domain slotting control comprising five kinds of time domain slotting control modes such as a conventional time slot control 201, a repetition unit control 202, an intelligence decision control 203, a repetition master transmission control 204 and an inquiry transceiving control 205.

The conventional time slot control conducts a time domain slotting control according to one master control time slot for master control program and one monitoring time slot for each monitor, the conventional time slot control 201 takes five monitors as an example, a time domain slotting is conducted according to the order of master control time slot 50, No. 1 monitoring time slot 51, No. 2 monitoring time slot 52, No. 3 monitoring time slot 53, No. 4 monitoring time slot 54, and No. 5 monitoring time slot 55, the master control program and the monitoring program each receives and transmits information based on such an order.

The repetition unit control conducts a time domain slotting control according to one master control time slot and one or more time slots for each monitor, which is intended to facilitate some monitors having a great amount of information, and a heavy workload to have more time to transmit information, the repetition unit control 202 takes four monitors as an example, when more failures occur in the scope of the field device responsible by No. 3 monitor, two time slots 56, 57 or more are successively allocated to the No. 3 monitor to ensure that the No. 3 monitor has more time to transmit information.

The intelligence decision control conducts a time domain slotting control according to one master control time slot and one, more or no time slots for each monitor, which automatically increases or decreases the time slots of some monitor according to the size of amount of information for monitor, such a method can make better use of time-slot resources, but it needs to determine the operating conditions of the monitor in real time and consumes more system resources, the intelligence decision control 203 takes four monitors as an example, when the No. 1 monitor is busy, two time slots 58, 59 are successively allocated, when the No. 2 monitor is busy, three time slots 60, 61 and 62 are successively allocated, in this event, the No. 3 monitor is not operating, and thus no time slots are allocated, going directly to No. 4 monitor, a time slot 63 is allocated.

The repetition master transmission control conducts a time domain slotting control according to more master control time slots and one, more or no time slots for each monitor, which is intended to mainly transmit master control information when more failures occur in the field device, the monitoring program needs to wait for the processing of the master control program and then allocates a time slot to the monitoring program after transmitting an inquiry request, this method makes a relatively slow response to the inquiry request of the monitoring program; the repetition master transmission control 204, master control time slots 64 and 65 are two successive ones, time slots are temporarily assigned to receive No. 2, No. 3 monitor information 66, 67 when information on the monitoring program is received, and a response is made to a transmission request 71 of the No. 3 monitor after another three master control time slots 68, 69 and 70 are assigned;

the inquiry transceiving control conducts a time domain slotting control when the master control program makes a response one by one according to the inquiry request of the monitor, in the case of more inquiry requests, the time slots assigned by the master control program in such a mode are relatively small, the included information is only directed towards some inquiry request, thus the amount of information is smaller; the inquiry transceiving control 205, after a master control time slot 72, an inquiry request 73 of the No. 1 monitor is received, thus the master control program assigns a master control time slot 74 to respond this request, similarly, when the inquiry requests of the No. 2, No. 3 monitors are received, after the time slots 75, 77, 79 and 81 are inquired, master control time slots 76, 78, 80 and 82 are immediately assigned to respond the inquiry requests, based on different specific content of the inquiry request, the assigned master control time slots are different in size, for instance, both the master control time slot 76 and the master control time slot 80 response the inquiry request of the No. 2 monitor, but the time slots are different in size.

As described above, the embodiments of the present invention have been described in detail, however, it will be obvious to a person skilled in the art that variations may be made without actually departing from the inventive aspects and effects of the present invention. Thus all such variations are within the scope of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. An automatic inspection and monitoring method based on time domain slotting control, characterized by comprising:
   a method of extraction and transmission of information of a field device by a seismic apparatus host, a method of reception and management of a field monitor on the information of a field device, an encoding protocol of information push and a time domain slotting control, wherein
   the method of extraction and transmission of a seismic apparatus host on the information of a field device is implemented by a master control program comprising:
   automatically extracting and classifying test information about the seismic apparatus host on the field device from the seismic apparatus host, and conducting a protocol encoding according to a designed encoding protocol of information push;
   automatically generating a data frame block; and
   then delivering the test information via a broadcasting station;
   the encoding protocol of information push is designed with the time domain slotting control for avoiding information loss caused by signal instability during information push; encoding the test information on the field device according to the encoding protocol of information push, to generate a data frame block with a CRC redundancy checking function, so that signals are effectively retrieved or retransmitted when the signals are lost, thereby ensuring information integrity; the encoding protocol of information push includes a channel data protocol, a voltage value protocol, a range value protocol, an inquiry request protocol and an instant dialog protocol; according to the encoding protocol of information push, encoding the information on the field device of the seismic apparatus host to generate a data frame block in a fixed format upon extraction and transmission; and then pushing the information in the fixed format;
   conducting parsing also according to the encoding protocol of information push while the field monitor receives this data frame block, so as to obtain state information on the field device,
   wherein the channel data protocol includes a channel data marker, a line bit, a stake bit, a sequence bit, a resistance value bit, an embedding value bit, an electrical-leakage-value bit, and a numbering bit,
   wherein the channel data marker is a marker that the field device data contained in this data frame block is channel data, the line bit and stake bit are numbers of line and stake where the field device is positioned, the sequence bit is a sequence number of this field device, the resistance value bit, the embedding value bit, and the electrical-leakage-value bit are concrete numerical values of resistance, embedment and electrical leakage of this field device, and the numbering bit is a numbering value that this data frame block needs to transmit to the field monitor, used for field personnel to perform a concrete item inspection for problematic field devices, the voltage value protocol includes a voltage value marker, a line bit, a stake bit, a sequence bit, a voltage value bit, and a numbering bit, wherein the voltage value marker is a marker that the field device data contained in this data frame block is a voltage value, the line bit and the stake bit are numbers of line and stake where the field device is positioned, the sequence bit is a sequence number of this field device, the voltage value bit is a concrete voltage value of this field device, and the numbering bit is a numbering value that this data frame block needs to transmit to the field monitor, used for the field personnel to replace or charge a field feeding device, the range value protocol includes a range value marker, a line bit, a starting stake bit, a sequence bit, a finishing stake bit, a sequence bit and a numbering bit, wherein the range value marker is a marker that the field device data contained in this data frame block is a range value, the line bit and the starting stake bit are numbers of line and stake where the field device is positioned, the sequence bit is a sequence number of this field device, the finishing stake bit is number of the stake where the field device is positioned, the sequence bit is a sequence number of this field device, and the numbering bit is a numbering value that this data frame block needs to transmit to the field monitor, used for the field personnel to learn about starting and finishing positions of the field device, so as to monitor whether the field device is in an off-line state, and know a specific position for inspection, the inquiry protocol includes an inquiry marker, a line bit, a stake bit and a numbering bit, wherein the inquiry marker is a marker that this data frame block is inquiry request data, the line bit and the stake bit are numbers of line and stake where the field device required to be inquired is positioned, and the numbering bit is a numbering value that this data frame block transmits to the field monitor, used for the field personnel to monitor programs to transmit an inquiry request to the master control program of the seismic apparatus host, and the instant dialog protocol includes a dialog marker, a content bit, and a numbering bit, wherein the dialog marker is a marker that this data frame block is instant dialog data, the content bit is the concrete dialog content contained in this data frame block, and the numbering bit is a numbering value that this data frame block needs to transmit to the field monitor or this data frame block transmits to the field monitor, used for delivering the instant dialog content between the seismic apparatus operator and field personnel;

the data frame block referring to state information on the field device of the seismic apparatus, and being encoded through the encoding protocol of information push, where the field device automatically generates one data frame block, since status information on the field device differs and the produced data frame block is different in size, each data frame block has a CRC redundancy checking function;

the master control program being installed onto the seismic apparatus host or other computers connected with the seismic apparatus host for implementing extraction and classification of information on the field device of the seismic apparatus host, and automatically generating a data frame block by using the encoding protocol of information push, and controlling a station to transmit the state of the field device of the seismic apparatus to the field inspection and monitoring program by using the time domain slotting method;

the method of reception and management of information about the field monitor on the field device being implemented by monitoring programs, comprising:
  parsing received data frame blocks according to the protocol format, storing and managing field device status data obtained by parsing according to setup requirements, thereby realizing the field personnel's automatic inspection and management of the seismic apparatus and device;

the monitoring programs being installed onto a hand-held intelligent transceiving tablet computer or other device supporting a co-band transceiving function compatible with a system for implementing a reception of the data frame block of the master control program by using the time domain slotting method, and automatically parsing the data frame block by applying the encoding protocol of information push for obtaining the state information on the field device of the seismic apparatus, and managing the state information according to the setup requirements;

the time domain slotting control being designed for avoiding signal loss caused by signal collisions of a field monitor, comprising:
  allowing a terminal device to transmit information by a time-share according to the time domain slotting control mode to ensure that a signal is stable;

the time domain slotting control comprising five kinds of control modes including a conventional time slot control, a repetition unit control, an intelligence decision control, a repetition master transmission control and an inquiry transceiving control, one of which is selected based on different requirements for operation after the information on the field device of the seismic apparatus host is extracted, the master control program recording a number of monitoring programs and applying a scheme of the extraction and transmission method for the field device of the seismic apparatus host based on requirements of parameter settings for conducting the time domain slotting control, so as to transmit information on the field device of the seismic apparatus host to each terminal program, wherein the conventional time slot control conducts a time domain slotting control according to one master control time slot for master control program and one monitoring time slot for each monitor, the repetition unit control conducts a time domain slotting control according to one master control time slot and one or more time slots for each monitor, the intelligence decision control conducts a time domain slotting control according to one master control time slot and one, more than one, or no time slots for each monitor, the repetition master transmission control conducts a time domain slotting control according to more master control time slots and one, more than one, or no time slots for each monitor, and the inquiry transceiving control conducts a time domain slotting control when the master control program makes a response one by one according to the inquiry request of the field monitor, in the case of many inquiry requests.

2. The automatic inspection and monitoring method based on time domain slotting control according to claim 1, characterized by comprising steps of:
   Step 1. installing a master control software onto the seismic apparatus host or other computers connected with the seismic apparatus host, and installing a monitoring software onto a hand-held intelligent transceiving tablet computer or other device supporting a co-band messaging function compatible with the system;
   Step 2. a master control program upon actuation automatically invoking parameter settings saved last time, and sending a master control program online notification, in this event, master control program parameters are changed at any time, the master control program parameters come into effect after an application is stored, the master control program waiting for a monitoring program online notification in operation at any time, and responding in a timely manner;
   Step 3. invoking the parameter settings saved last time automatically when a monitoring program is actuated, and sending a monitoring program online notification automatically, parameters of monitoring programs are changed at any time until an acknowledgement notification of the master control program and time domain slotting time information are received, the parameters of monitoring programs come into after the application being stored;
   Step 4. the master control program, at the time of transmitting information on the field device of the seismic apparatus host to each terminal program, waiting for and processing information from a terminal monitor; at the same time, a terminal program functions applying a field monitor and a monitoring and managing method of the field device information until an order of forcing to be offline from the master control program or taking the terminal program off-line through manual closing is received; and
   Step 5. when the terminal program is off-line, the master control program may automatically respond and change the time domain slotting control method;
   when the master control program is off-line, the terminal program may also automatically respond, and automatically periodically send out a request signal of going on-line, and then continue to operate normally until there is a response from the master control program.

3. The automatic inspection and monitoring method based on time domain slotting control according to claim 1, characterized by comprising steps of:
   extracting and classifying the corresponding data from the field device status data tested by the seismic apparatus host, according to the automatic extraction and transmission process of information on the field device of the seismic apparatus host, encoding according to the information push protocol and transmitting the data frame block, field personnel receive the data frame block through the field monitor in the reception and management method flow for the field device information and parse the data frame block according to the information push protocol, obtain the state of the field device and conduct management according to the setup requirements, thereby realizing the field personnel's automatic inspection and monitoring of the field device;
   the method of extraction and transmission of the information on the field device of the seismic apparatus host is realized by self-programming software, comprising:
   when the self-programming software starts to run, firstly detecting whether field information is received, when this is the case, carrying out determination of an inquiry information, when it is determined to be inquiry information, automatically refreshing information on the field device, and transmitting information according to inquiry requirements, when the inquiry is determined to be non-inquiry information, it is instant message information, which is directly shown;
   when it is determined to be not receiving the field information, automatically reading field arrangement information, and classifying the information on the field device according to requirements of a value threshold and a scope of personnel, and then performing a refreshing determination, when performing a refreshing is continued, returning to the status of information reception for cycles, and when the refreshing is completed, it is in a standby state;
   the method of reception and management of the information about the field monitor on the field device is realized by self-programming software, comprising:
   when the self-programming software starts to run, firstly detecting whether a host information is received, when this is the case, determining if the host information is a message, and when the host information is a message, displaying the message, when it is determined to be a message, showing an instant message;
   when it is determined to be a non-message, managing the field device information according to setup requirements of this monitor, and automatically refreshing the information on this device;
   when it is determined that the host information on this device was not received, detecting whether the transmission requirements are met; when met, transmitting an instant message, if not met, transmitting the inquiry information;
   the conventional time slot control takes five monitors, a time domain slotting is conducted according to the order of master control time slot, No. 1 monitoring time slot, No. 2 monitoring time slot, No. 3 monitoring time slot, No. 4 monitoring time slot, and No. 5 monitoring time slot, the master control program and the monitoring program each receives and transmits information based on such an order;
   the repetition unit control takes four monitors, when many failures occur in the scope of the field device responsible by No. 3 monitor, two or more time slots are successively allocated to the No. 3 monitor to ensure the No. 3 monitor have more time to transmit information;
   the intelligence decision control conducts the time domain slotting control according to one master control time slot and one, more or no time slots for each monitor, which automatically increases or decreases the time slots of some monitor according to the size of amount of information for monitor, so as to make better use of time-slot resources, the intelligence decision control takes four monitors, when the No. 1 monitor is busy, two time slots are successively allocated, when the No. 2 monitor is busy, three time slots are successively allocated, in this event, the No. 3 monitor is not operating, and thus no time slots are allocated, going directly to No. 4 monitor, a time slot is allocated;

the repetition master transmission control transmits information dominated by master control information when the number of failures in the field device is larger than a preset value, the monitoring program waits for the processing of the master control program and then allocates a time slot to the monitoring program after transmitting an inquiry request; the repetition master transmission control, master control time slots are two successive ones, time slots are temporarily assigned to receive No. 2, No. 3 monitor information when information on the monitoring program is received, and a response is made to a transmission request of the No. 3 monitor after another three master control time slots are assigned;

the inquiry transceiving control conducts the time domain slotting control when the number of the inquiry request is larger than a preset value, the master control program makes a response one by one according to the inquiry request of the field monitor;

the inquiry transceiving control, after a master control time slot, if an inquiry request of the No. 1 monitor is received, the master control program assigns a master control time slot to respond this request, if the inquiry requests of the No. 2, No. 3 monitors are received, after an inquiry time slots master control time slots are immediately assigned to respond the inquiry requests, based on different specific content of the inquiry request, the assigned master control time slots are different in size.

* * * * *